United States Patent [19]
Kilgore, Jr.

[11] Patent Number: 5,022,764
[45] Date of Patent: Jun. 11, 1991

[54] EASEL FOR OPTIMIZING PHOTOGRAPHIC COLOR PRINTS

[75] Inventor: James S. Kilgore, Jr., Dallas, Tex.

[73] Assignees: Doyle J. Craig, Jr.; Tom D. Copeland, Jr., both of Garland, Tex. ; a part interest to each

[21] Appl. No.: 377,543

[22] Filed: Jul. 10, 1989

[51] Int. Cl.$^5$ .......................... G01J 3/40; G03B 27/58
[52] U.S. Cl. ........................................ 356/404; 355/74
[58] Field of Search ................... 356/404; 355/72, 73, 355/74, 54

[56] References Cited

U.S. PATENT DOCUMENTS 3,718,397 2/1973 Smajo ................................. 356/404
4,603,967 8/1986 Virtanen ............................... 355/72
4,821,079 4/1989 Yoder ................................... 355/74

Primary Examiner—Vincent P. McGraw
Assistant Examiner—LaCharles P. Keesee
Attorney, Agent, or Firm—T. D. Copeland

[57] ABSTRACT

The instant invention provides a means and method for the photographic art of selecting the proper color light filters used to make color prints by preparing a matrix of nine images on a single sheet of color print paper. An easel fashioned with an integral filter magazine encasement and a rotatable and trnaslatable pedestal allow nine discrete images to be exposed onto a single sheet of color print paper thereby eliminating the need for using several sheets of color print paper, which results in economy of materials and time.

13 Claims, 6 Drawing Sheets

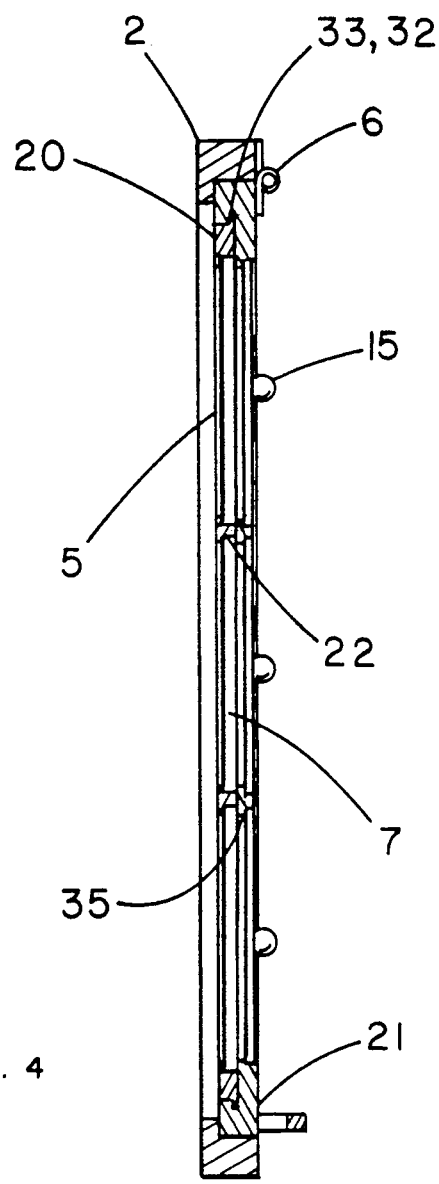
FIG. 7
| TRANS POS. | WINDOW EXPOSED | |
|---|---|---|
| | 0° | 180° |
| 1 | A | J |
| 2 | B | H |
| 3 | E | E |
| 4 | F | D |
| 5 | C | G |
FIG. 8
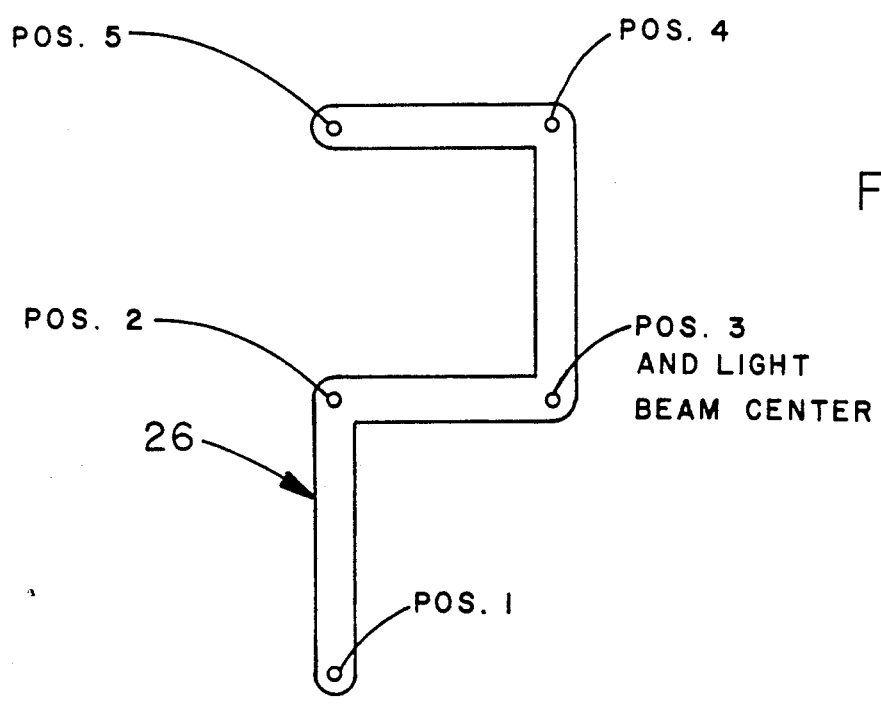
FIG. 9

EASEL FOR OPTIMIZING PHOTOGRAPHIC COLOR PRINTS

BACKGROUND OF THE INVENTION

The art of making successful color prints from a color negative (or positive) transparent film by a hobbyist, or small commercial operation, requires several trial prints be made in order to select the appropriate combination of light filters to add or subtract certain color components of light which are transmitted through a color film to the print paper. The use of costly electronic devices, in the hands of skilled technicians, to add or subtract certain color components of light are used by large commercial photographic film processors. These present processes are known as "color calibrating" or "color balancing". Both procedures are costly in terms of time and materials. The instant invention provides a means for printing nine images of various colors and intensities on a single sheet of color print paper thereby providing the viewer with multiple choices to determine the optimum color print from the available combinations, and simultaneously resulting in a savings of time and material. This invention additionally provides a means and method of making collage of different images on the same sheet of print paper using various film negatives or positives.

PRIOR ART

It is known to use a mask placed over the color print paper exposing ⅓ or ¼ of the paper to white light from the enlargers lamp for a predetermined time period, and then selecting color light filters that either add or subtract certain color components of light from a beam of white light passed through the film. Time of exposure, and color filter arrangement are recorded with each exposure and the best color balance is determined with a densitometer, or as in most cases, by visual examination. Several sheets of color print paper are used before the color balance, or color calibration, is realized. This becomes an expensive procedure for the hobbyist or for small commercial processing operations.

There are several conditions known in the photographic development art which make the process of color calibrating necessary. The most important are film types, the specific emulsion placed on the films, and/or on the color print paper, the type of light absorbing filters, and the voltage variations at the light source. Prior art also teaches that electrical voltage supplied to the light source should be closely regulated since a 5% variation in voltage during exposure can have a detrimental effect upon the color calibration procedures. Most electrical power companies provide regulated electrical voltage to their meters that is within 1%, and most large commercial processing operations also provide additional voltage regulation to their enlargers. However, the hobbyist or small processing operator will not normally have regulated voltage to his light source (usually his enlarger lamp), and random starting and stopping of appliances or equipments will cause large voltage variations to his light source.

Prior art patent to Joseph J. Smajo, U.S. Pat. No. 3,620,727, issued Nov. 16, 1971, teaches a method whereby a sheet of color print paper is positioned on a target board equipped with pilot pins around the perimeter of the paper. This print paper must be electrostatically charged to be compatible with the developer emulsion used, and thereafter a group of target masks comprising a frame supporting several filters of the same color, but with varying densities, are laid over the print paper in a manner to cause the pilot holes to engage matching the pilot pins in the target board, and thus align and position the target mask over the color print paper. An exposure is then made, the print paper is developed in a particular medium with respect to the first selected filter color, the print paper is then returned to the target board, and again electrostaticly charged, and a second target mask is positioned at 90 degrees from the previous target mask, and the first sequence of operations is repeated. Repeated exposures are made until all four quadrants of the color print paper have been exposed and developed. The resulting print is referred to as a test wedge and is similar to the "ring around" procedure used in certain prior art procedures. Several target masks are necessary, which require careful storage to prevent bending, because a bent filter will cause "flaring" and other distortions of the image printed. Four seperate developing processes are thus required to produce the desired test results using this method and equipment.

The instant invention provides a translatable and rotatable pedestal, a filter magazine comprising a filter screen with removable doors, and a filter tray wherein filters may be selectively replaced as desired. This invention also requires the use of only one full size (e.g. 8"×10") sheet of print paper, and a single developing process which results in less time and material required to produce nine smaller test prints for color calibrating.

SUMMARY OF THE INVENTION

A principal object of this invention is to provide an easel equipped with a translatable and rotatable pedestal upon which a single sheet of color print paper may be placed and exposed to a nine images through different color filters of various colors and color densities. The resulting color calibration prints are then examined to determine the correct filter or filters to be used for the final full size or enlarged color prints.

Another object of this invention is to provide a filter magazine encasement wherein the filter magazine encasement is hinged along one edge allowing the opposite edge to be raised providing clear access to the color print paper and its supporting pedestal.

A further object of this invention is to provide a filter magazine wherein at least nine light color filters of various colors and/or color densities are contained. This arrangement permits a single sheet of print paper to be employed to create nine test size reproductions to identify the quality of each result using a different filter or combination of filters.

A still further object of my invention is to provide a voltage regulation device, encased in the easel's base, whereby regulated voltage is supplied to the enlarger lamp.

These and other objects of my invention will be apparent from an examination of the following descriptions and drawings.

BRIEF DESCRIPTION OF THE DRAWINGS

FIG. 7 is a section view taken along line 7—7 thru item 2 in FIG. 3.

FIG. 8 is a table of window exposures

FIG. 9 is a detail outline view of particularly configured slot.

Attention is now turned in greater particularity to the figures of reference on the drawings.

DESCRIPTION OF THE ILLUSTRATED EMBODIMENTS

Figure 1:
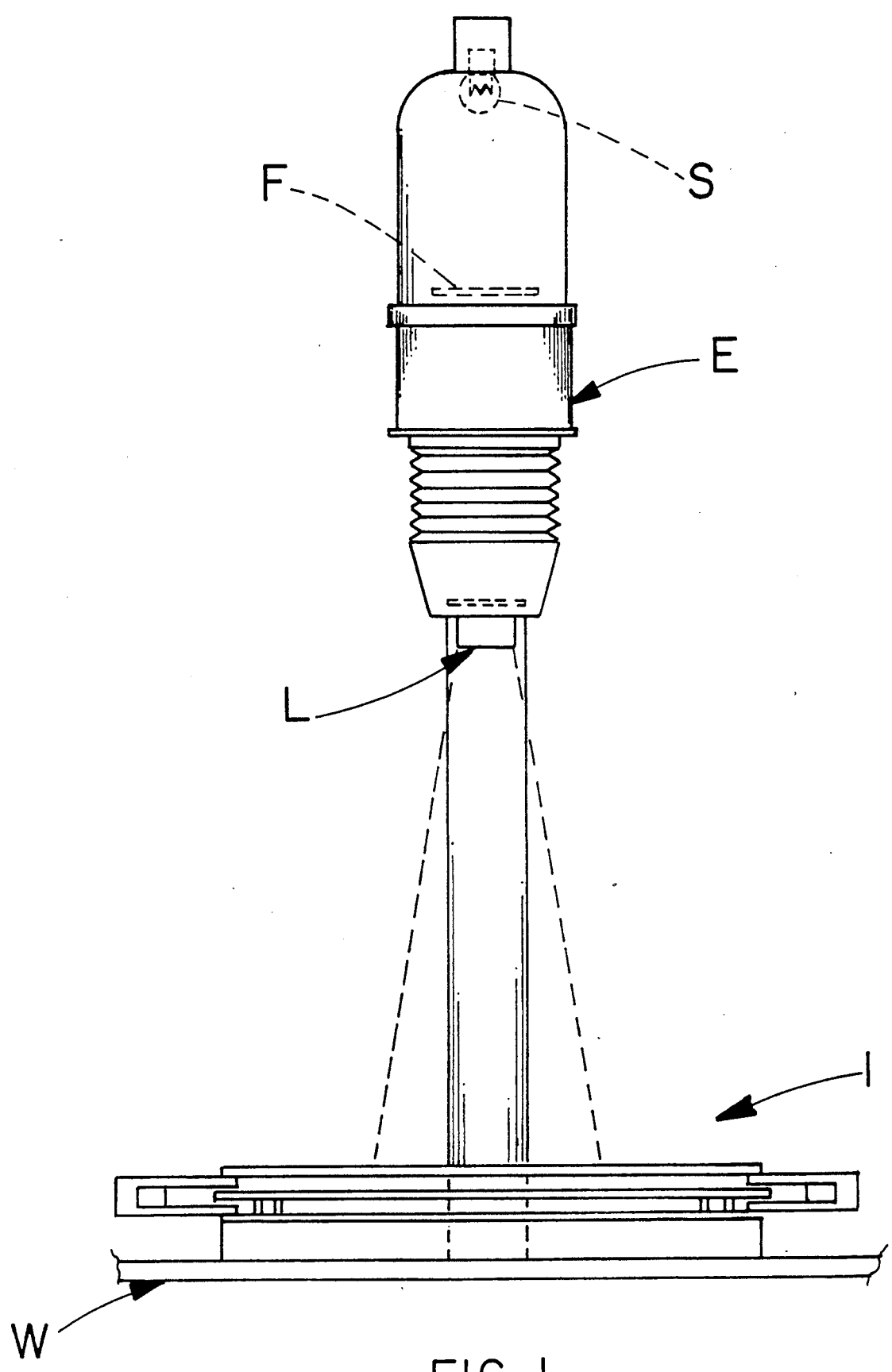
FIG. 1 is an outline front view showing the easel in a position of use with a photographic enlarger.

FIG. 1 is a front view of a photographic enlarger E, wherein a light source S, a negative or positive film F, is supported, and the instant invention 1 is shown in a position for use below the lens L of the enlarger E, and resting on work bench W.

Figure 2:
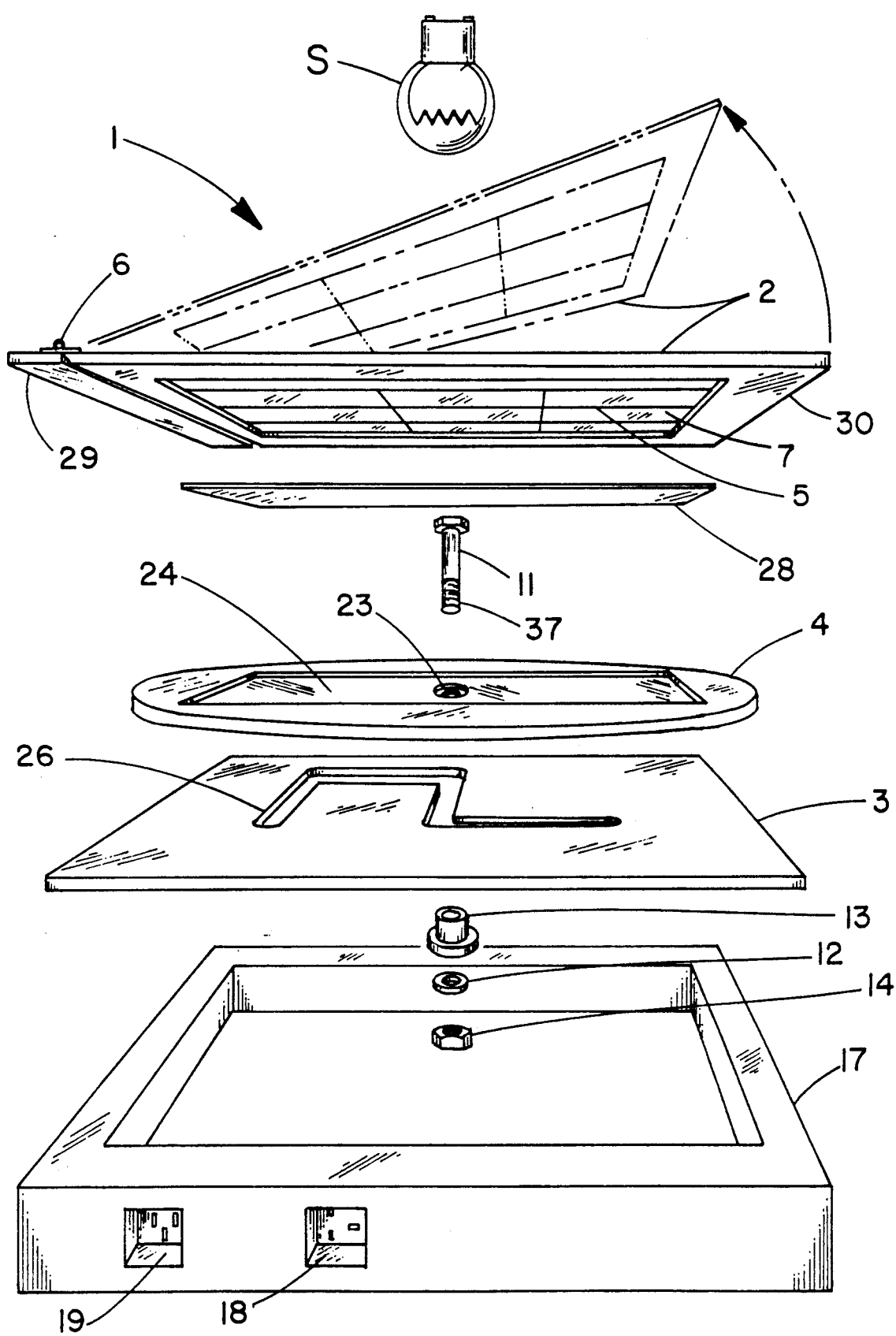
FIG. 2 is an exploded pictorial view of the easel of this invention which depicts the relationship of the major components of the invention.

FIG. 2 is an exploded view of a preferred embodiment wherein a pedestal 4 having a recess 24 formed in its upper surface of such dimensions as to accomodate at least one sheet of color print paper 28 minimum sized 8"×10". A counterbored hole 23 is centrally positioned within recess 24, and sized to accept pivot pin 11 wherein the upper surface of the pivot pin's head is at or below the surface 24 (as better seen in FIG. 5). A single array of detents 25 in the bottom surface of pedestal 4 is shown in FIG. 5, as being symmetrically located about counterbored hole 23 and corresponding to the geometric location of their mating detent pins 8 of platen 3. Pedestal 4 may be of a molded thermoplastic material, as well as of metal or other materials with appropriate properties. The device shown in FIGS. 2–7 includes a platen 3 with a particularly configured slot 26 (FIG. 9), which defines the translational path followed by pedestal 4. The function of platen 3 and pedestal 4 allows for use of a molded plastic material for these parts: however, a light weight metal would also be satisfactory. The selected material will require the proper physical and chemical properties with particular attention to the coefficient of friction between the material selected and the dry metal of detents 8 and pivot pin 11, to provide smooth translational and rotational motion for pedestal 4.

Figure 3:
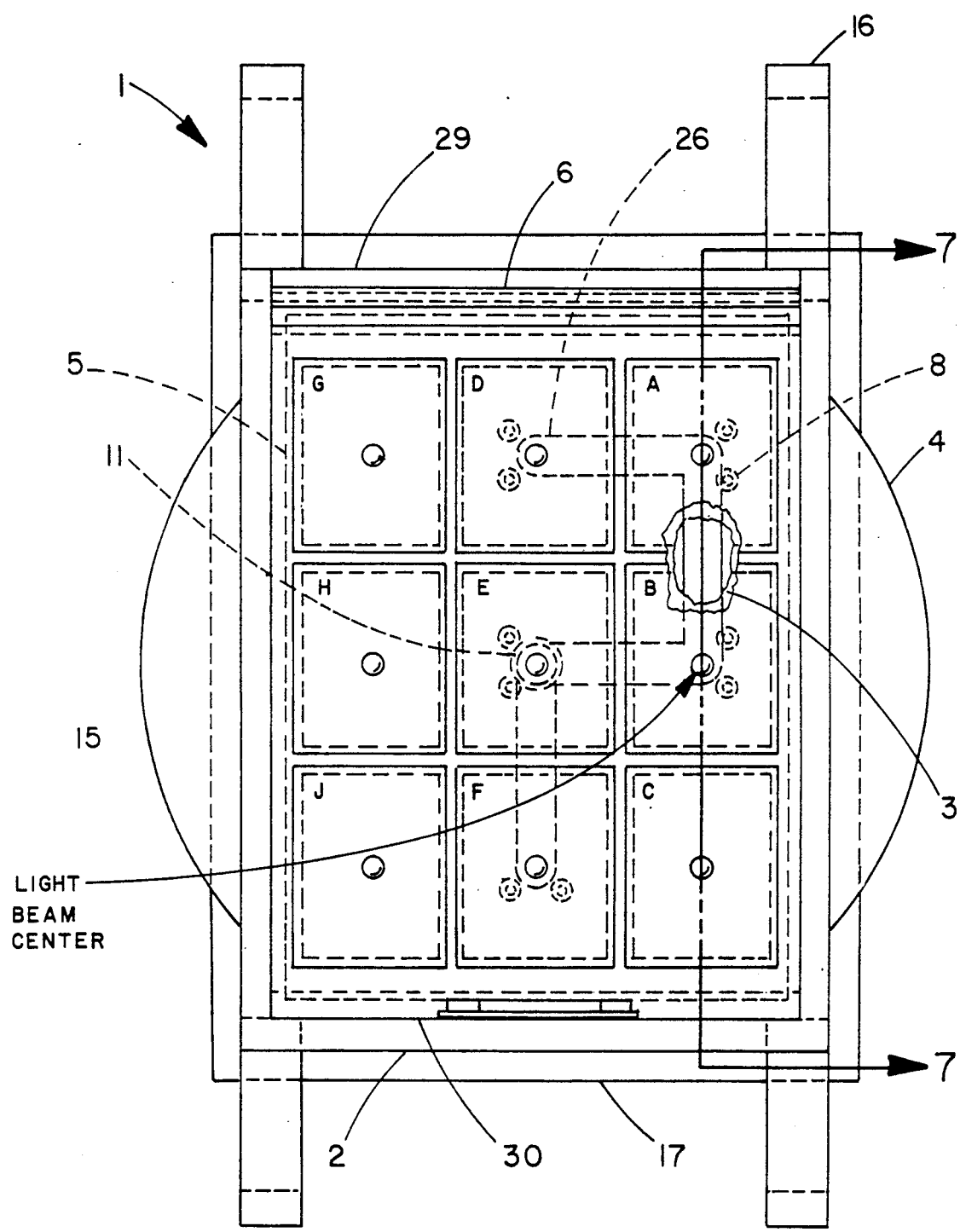
FIG. 3 is a view looking down from the light source into the filter magazine encasement and showing the positions of the various light filters installed therein.
Figure 4:
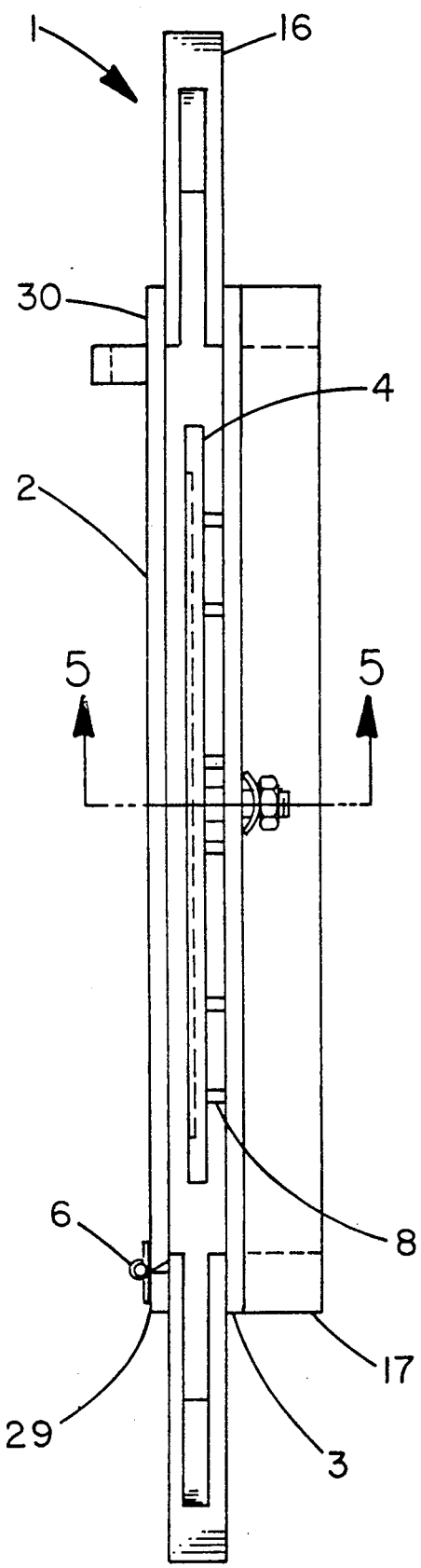
FIG. 4 is an end view of the easel shown in FIGS. 2 and 3.
Figure 5:
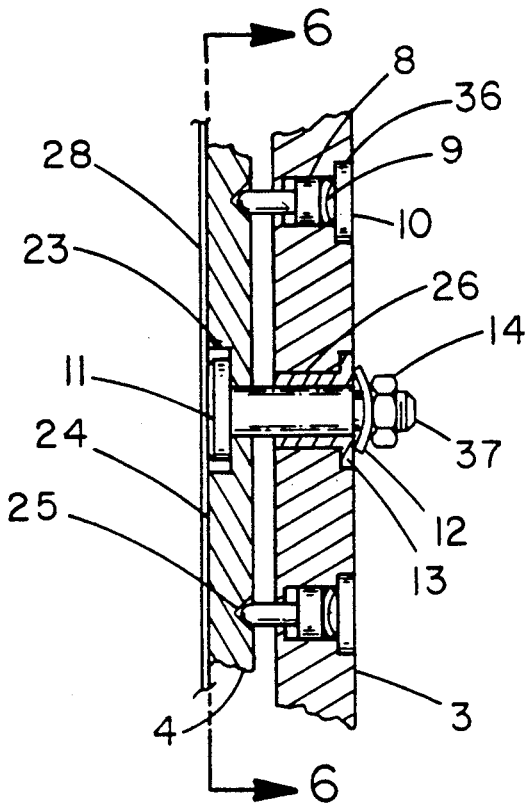
FIG. 5 is a fragmentary sectional view taken along line 5—5 in FIG. 4.
Figure 6:
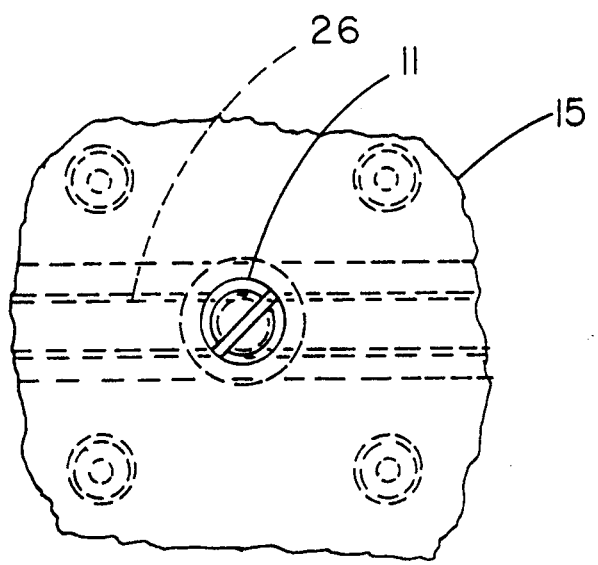
FIG. 6 is a fragmmentary view taken along line 6—6 in FIG. 5.

FIGS. 3–5 shows platen 3 to be equipped with spring actuated detent pins 8 which are grouped and regularly spaced along the path of slot 26 shown in FIG. 3. These groupings are indexing stations providing positional control for pedestal 4 under the beam of the light source L, generally from an enlarger E of FIG. 1. Each indexing station is comprised of at least one spring actuated detent pin 8 secured into a counterbored hole 36 with disc spring 9 by sealing plug 10 as pictured in FIG. 5. FIG. 4 portrays pedestal 4 supported on the tips of detent pins 8, centrally positioned between platen 3 and filter magazine encasement 2. Encasement supports 16, fastened to the bottom surface of encasement 2, and similarly to the top surface of platen 3, position encasement 2 and platen 3 vertically apart at a distance convenienant for movement of pedestal 4. A method of securing pedestal 4 to platen 3 is depicted in FIG. 5, wherein pivot pin 11 is placed through counterbored hole 23 in pedestal 4, through the bore of flanged bearing 13 which is installed into slot 26, and subsequently through the inside diameter of cup spring 12, and is secured with a slight deflection of the cup spring 12 with threaded fastener 14 which engages the threaded end 37 of pivot pin 11. The filter magazine encasement 2, shown in FIGS. 2–4 has one fixed member 29, and a liftable member 30 being joined by hinge 6. Filter magazine 5 and light filters 7 are shown in their relative positions within the filter magazine encasement 2. Several encasement supports 16 are attached to the bottom surface of the encasement 2 and in a similar manner to the top surface of platform 17. A suggested arrangement of the encasement supports 16, is shown in FIGS. 3 and 4. A preferred material for the fixed member 29 and the liftable member 30 is General Electric's "Lexan" or other plastic or a light weight metal with acceptable structural, physical and chemical properties. Platform 17, shown in FIGS. 2–4 is a support structure of a configuration accomodating internally an electrical voltage regulator (not shown), and may be made of a plastic molding material such as General Electric's "Lexan" or comparable material. This voltage regulator provides regulated electrical voltage within 1% or less, and is directed to the enlarger's lamp though the electrical socket 18, and a conventional electrical conducting cord (not shown), thereby generating the light source "L", which is a beam of white light with the full spectrum of light colors. Since electrical voltage regulators and conducting cords are common commercial products, only the input socket 19 and the regulated output socket 18 are shown in FIG. 2.

Figure 10:
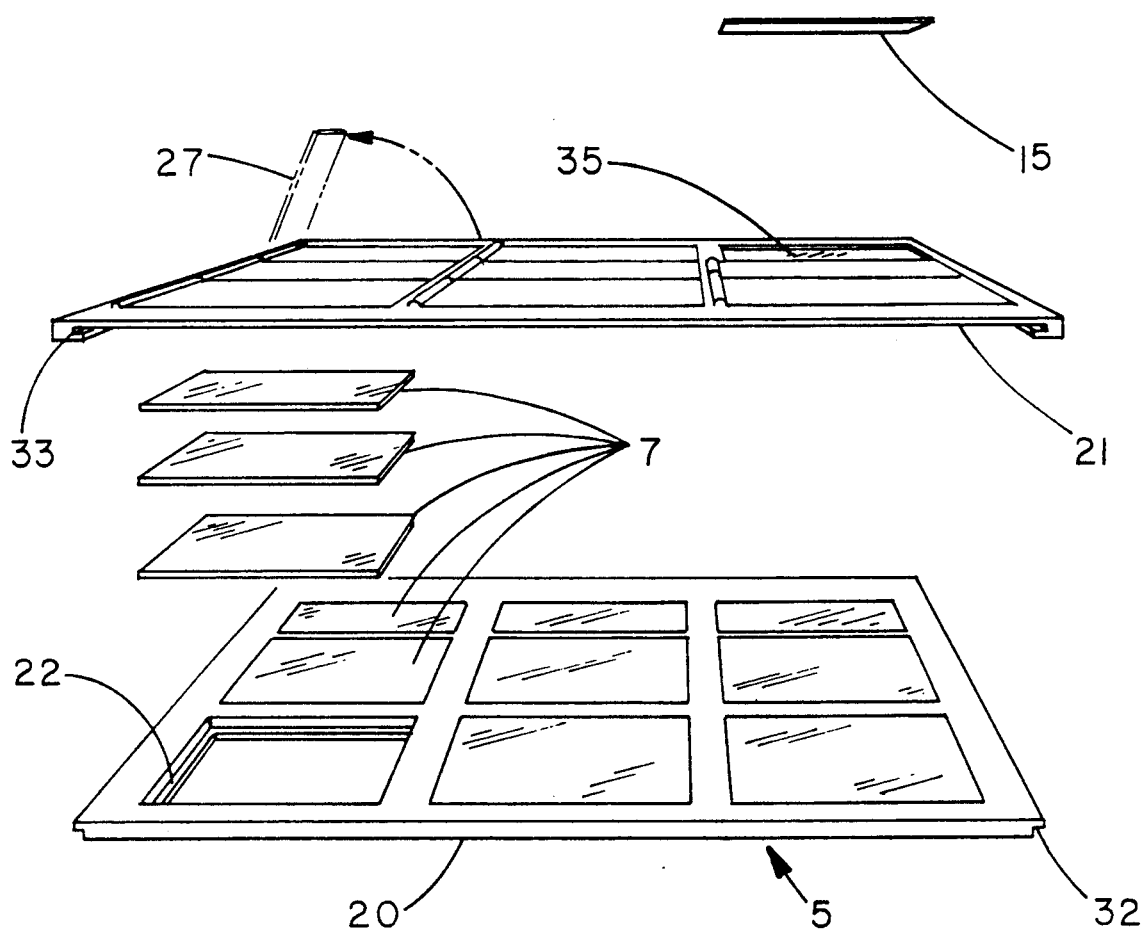
FIG. 10 is an exploded pictorial view of the filter magazine detached from its hinge mounting.

Filter magazine 5, best illustrated in cross-section in FIG. 7, comprises a filter tray 20, filter screen 21, and an assortment of at least one light filter 7 placed in each of the nine recessed windows 22. Filter screen 21 is particularly compatible with fabrication methods used with a semi-rigid plastic material which is configured to have nine bezels 35; wherein nine removable doors 15 are placed, or alternatively hinged, as shown at 27 in FIG. 10. Filter screen 21 is further configured to have two internal parallel grooves 33 beneath the window bezels 35. Filter tray 20 is formed with nine recessed windows 22 in its upper surface that are coordinated positionally with the nine bezels 35 in filter screen 21. Filter tray 20 is further formed to have two parallel rabbeted lips 32 dimensionally slightly less than the mating grooves 33 in filter screen 21 whereby a sliding, interlocking fit is obtained as is shown in FIG. 7.

A procedure to follow, and thereby creating a matrix of nine images on print paper 28 using the instant invention, comprises the steps described in the following paragraphs. Light filter colors magenta, cyan, and yellow are used in the discussion to follow as examples only, and do not limit the instant invention to these particular filters.

Filter magazine 5 is removed from the filter magazine encasement 2, and filter tray 20 is disengaged from the filter screen 21. Different color or color density filters 7 are then loaded into windows 22 which are labled "A" through "J" in FIG. 3. Filters 7 with color densities 10M, 20M, and 30M are placed into windows 22 "A", "B", and "C" respectively. Filters 7 with color densities 10C, 20C, and 30C are subsequently loaded into windows 22 "D", "E", and "F". Lastly filters 7 with color densities 10Y, 20Y, and 30Y are loaded into windows 22

"G", "H", and "J". Now loaded, filter tray 20 is assembled into filter screen 21, as shown in FIGS. 3 and 7, thereby forming a filter magazine 5 which is subsequently assembled into the filter magazine encasement 2.

The easel 1 is placed on a work bench W surface below the lens L of enlarger E, and is secured positionally whereby the enlarger's beam of white light is centered onto closed window 22 at position "B" shown in FIG. 3. Pedestal 4, with pivot pin 11, is centered in slot 26 at indexing station number (2) shown in FIGS. 3 and 9. FIG. 9 is a detail view of the particularly configured slot 26 wherein indexing stations (1)-(5) are shown. FIG. 8 is a table, supportive of FIG. 9, whereby the windows 22 that may be exposed to the enlarger's beam of white light are identified with respect to the rotational position of pedestal 4 at any indexing station.

In the recommended method of use, liftable member 30 of the filter magazine encasement 2 is opened, a sheet of color print paper 28 is placed into recess 24 of pedestal 4, and the member 30 is closed. All removable doors 15 (or 27, if hinged) of filter magazine 5 are shut thereby shielding the color print paper 28 from the light source S. Pedestal 4 is translated to indexing station number (1) thereby placing the color print paper in position for exposure of area "A". The enlarger's light source S is illuminated, one removeable door 15 is removed for a period of time exposing area "A" of the print paper 28 to the light source S. The one removeable door 15 is replaced, and pedestal 4 is rotated angularly 180 degrees whereby area J of print paper 28 is positioned for exposure to the same light source L. A second removable door 15 is removed exposing area J of the color print paper 28 for a period of time to the light source S. That removable door 15 is replaced, and pedestal 4 is translated successively to indexing stations (2) through (5) repeating the previous steps at each indexing station until all areas of the color print paper 28 have been exposed to the light source S through the various densities of light filters 7. When processed in the developing fluid, and still in the dark room, the resulting print is known in photographic language as a "ring around", although it may be better defined as a "multiple image matrix", whereas the first row of images will have decreasing intensities of red and green colors, and successively increasing blue color intensity. The second row of images will have successively decreasing green and blue colors, while the color red will be successively increasing in intensity. Finally the images in the third row will have decreasing amounts of red and blue colors, while the color yellow will be ever increasing in each of these images. These colors are the result of the filters selected for this example, other arrangements of filters will furnish different results and are selected based upon the operators experience with the materials he is working with. This matrix of nine images is examined visually by the operator to find the specific image with the color balance that is best suited for his objective, and once found he will be able to identify the specific filter, or group of filters for use with his project.

From the foregoing description it is readily seen that there has been produced a device substantially fulfilling the objects of the invention as set forth herein. The invention is not limited to the exemplary construction and use herein shown and described, but may be made and used in many ways within the scope and spirit of the appended claims.

What is claimed:

1. In an easel device for preparing color calibration test prints by selective exposure of print paper to a film image through light filters and a light source, having a print paper support pedestal and a plurality of light filters encased in a filter magazine, and a means for rotating said pedestal selectively under each light filter within said light filter magazine, the improvement comprising:
   a. a single pivot pin for translation direction control for said print paper support pedestal;
   b. a platen with a continuous slot providing a translational path to be followed by said pivot pin;
   c. a filter magazine encasing said light filters.

2. In an easel device as in claim 1, a translation control means comprising a single pivotal device rotatably attached to said pedestal, and slidably disposed within said slot in guided relation thereto.

3. An easel device as in claim 2 whereas said support means is a single fixed platen.

4. An easel device as in claim 2 whereas said translation guidance means is an orthoganal slot therein.

5. An easel device as in claim 2 whereas said filter magazine is hinged along one side for allowing the plurality of light filters to be rotated open thereby allowing access to said paper support pedestal.

6. An easel device as in claim 4 whereas said orthogonal slot comprises at least four slots continuously connected.

7. An easel device as claim 4 whereby said orthoganal slot provides at least five (5) indexed positions.

8. An easel device as in claim 4 whereas said slot comprises parallel opposed sides through and transverse to the top and bottom surfaces of said platen.

9. A method for making a plurality of different color images on a single sheet of print paper using a light source, a plurality of light filters encased within a filter magazine, and an easel, comprising the steps of:
   a. installing a sheet of color photographic print paper on the support pedestal of said easel
   b. placing said light filters over said print paper
   c. energizing said light source
   d. translating said pedestal to a first position provided by a continuous slot guidance means of said easel exposing a first area of said print paper to a first image
   e. covering said first exposed area, and rotating the pedestal 180 degrees thereby positioning a second area of said print paper for exposure to a second image
   f. repeating steps d and e through the remaining indexing positions thereby providing a plurality of images of various color intensities orthogonally positioned on said paper.

10. In an easel device for preparing color calibration test prints by selective exposure of print paper to a film image through light filters and alight source, having a print paper support pedestal and a plurality of light filters encased in a filter support means with means for rotating said paper support pedestal selectively under each light filters, the improvements comprising:
   a. a single translation control means for said paper support pedestal;
   b. support means for said translation control means;
   c. a configured slot means to receive said translation control means in a guided relationship;
   d. said print paper pedestal being adapted to follow said configured slot in such a manner that segments said paper are guided selectively and exposed to said light source through said filters; whereby e. said print paper when subsequently developed presents an immediate comparison of the color enhancement of each individual filter on a single sheet of print paper.

11. In a device having a pedestal supported base for preparing a plurality of test prints on a single sheet of print paper for color calibrating reproduction equipment, the improvement comprising:

a. a print paper support pedestal having translating and rotating means within a slot for positioning said pedestal with respect to a light source and image;

b. An integral voltage regulation means for controlling variations in the intensity of said light source whereas said voltage regulation means is positioned in said base;

c. a filter magazine overlying said print paper support pedestal.

12. In a device as in claim 11, the improvement wherein said translating means is composed of a pivot pin in sliding translational engagement with said slot in a planar structure having a plurality of continuously connected indexing positions.

13. An improvement as in claim 12 wherein said rotating means is a pivot pin in rotational engagement with said print paper support pedestal.

* * * * *